(12) United States Patent
Corvisier

(10) Patent No.: US 10,308,425 B2
(45) Date of Patent: Jun. 4, 2019

(54) SECURING OF SHEET MATERIAL WHICH IS IN THE FORM OF A LINER, A COVER OR A CURTAIN

(71) Applicant: JF Hillebrand Limited, Dublin (IE)

(72) Inventor: Pierre Corvisier, Beaune (FR)

(73) Assignee: JF Hillebrand Limited, Dublin (IE)

( * ) Notice: Subject to any disclaimer, the term of this patent is extended or adjusted under 35 U.S.C. 154(b) by 0 days.

(21) Appl. No.: 15/885,626

(22) Filed: Jan. 31, 2018

(65) Prior Publication Data

US 2018/0155120 A1 Jun. 7, 2018

Related U.S. Application Data

(63) Continuation of application No. 15/397,608, filed on Jan. 3, 2017, now abandoned, which is a continuation
(Continued)

(30) Foreign Application Priority Data

Nov. 26, 2013 (ZA) .................................. 2013/08869
Sep. 29, 2014 (ZA) .................................. 2014/07040

(51) Int. Cl.
*B65D 90/04* (2006.01)
*A47H 13/01* (2006.01)
(Continued)

(52) U.S. Cl.
CPC ............. *B65D 90/046* (2013.01); *A47H 1/18* (2013.01); *A47H 13/01* (2013.01); *A47H 13/04* (2013.01);
(Continued)

(58) Field of Classification Search
CPC .. B65D 88/1606; B65D 90/021; B65D 90/04; B65D 90/046; F16B 5/0692
(Continued)

(56) References Cited

U.S. PATENT DOCUMENTS 4,097,169 A 6/1978 Kelly
4,461,402 A * 7/1984 Fell ..................... B65D 90/046
105/423
(Continued)

FOREIGN PATENT DOCUMENTS

DE 102 39 206 A1 3/2004
EP 0 716 988 A2 6/1996
(Continued)

OTHER PUBLICATIONS

European Patent Office, Extended European Search Report, dated Apr. 1, 2015, issued in European Patent Application No. EP 14 19 0811.

*Primary Examiner* — Johnnie A. Shablack
(74) *Attorney, Agent, or Firm* — Klarquist Sparkman, LLP

(57) ABSTRACT

A sheet which constitutes a liner, cover or curtain is secured to a shipping container. The sheet has an elongate attachment zone which is thicker than the material of the sheet. A clip is formed with an elongate hollow portion having a longitudinal slit along the length thereof. The attachment zone of the sheet is in the hollow portion of the clip with the sheet emerging from the clip through the slit. A cord is connected to a lashing point in the shipping container. The clip has a passageway through which the cord passes thereby to attach the, clip and the attachment zone to the lashing point.

3 Claims, 5 Drawing Sheets

Related U.S. Application Data of application No. 14/527,075, filed on Oct. 29, 2014, now abandoned.

(51) Int. Cl.
*A47H 13/04* (2006.01)
*A47H 23/00* (2006.01)
*F16B 5/06* (2006.01)
*A47H 1/18* (2006.01)

(52) U.S. Cl.
CPC ........... *A47H 23/00* (2013.01); *F16B 5/0692* (2013.01); *B65D 2590/046* (2013.01)

(58) Field of Classification Search
USPC ........................................ 160/368.1; 220/1.6
See application file for complete search history.

(56) References Cited

U.S. PATENT DOCUMENTS

| | | | | |
|---|---|---|---|---|
| 4,541,765 A | * | 9/1985 | Moore | B65D 88/62 220/1.6 |
| 4,674,127 A | * | 6/1987 | Yamada | B65D 90/046 229/117.27 |
| 4,792,239 A | * | 12/1988 | Hamada | B65D 90/046 220/495.06 |
| 5,193,710 A | | 3/1993 | Podd, Sr. et al. | |
| 5,570,801 A | * | 11/1996 | Younger | B65D 88/14 160/328 |
| 5,632,400 A | | 5/1997 | Podd, Sr. et al. | |
| 5,639,164 A | * | 6/1997 | Ishino | B65D 90/046 220/1.5 |
| 6,079,934 A | * | 6/2000 | Beale | B65D 88/1612 294/68.1 |
| 6,132,088 A | | 10/2000 | Suzuki | |
| 6,155,772 A | * | 12/2000 | Beale | B65D 88/1612 294/68.1 |
| 6,662,962 B2 | * | 12/2003 | Neto | B65D 90/046 220/1.6 |
| 6,755,232 B1 | * | 6/2004 | Holland | B65D 88/125 160/368.1 |
| 7,416,091 B2 | | 8/2008 | Yong | |
| 7,938,283 B2 | | 5/2011 | Villers et al. | |
| 2008/0237226 A1 | * | 10/2008 | Yong | B65D 90/046 220/1.6 |
| 2012/0328685 A1 | | 12/2012 | Stutz et al. | |
| 2015/0144277 A1 | * | 5/2015 | Courvisier | A47H 13/01 160/332 |
| 2017/0113871 A1 | * | 4/2017 | Corvisier | B65D 90/046 |

FOREIGN PATENT DOCUMENTS

| | | |
|---|---|---|
| EP | 1 010 646 A2 | 6/2000 |
| EP | 1 780 147 A1 | 2/2007 |
| JP | 2010-280414 A | 12/2010 |
| WO | WO 2010/046790 A1 | 4/2010 |

* cited by examiner

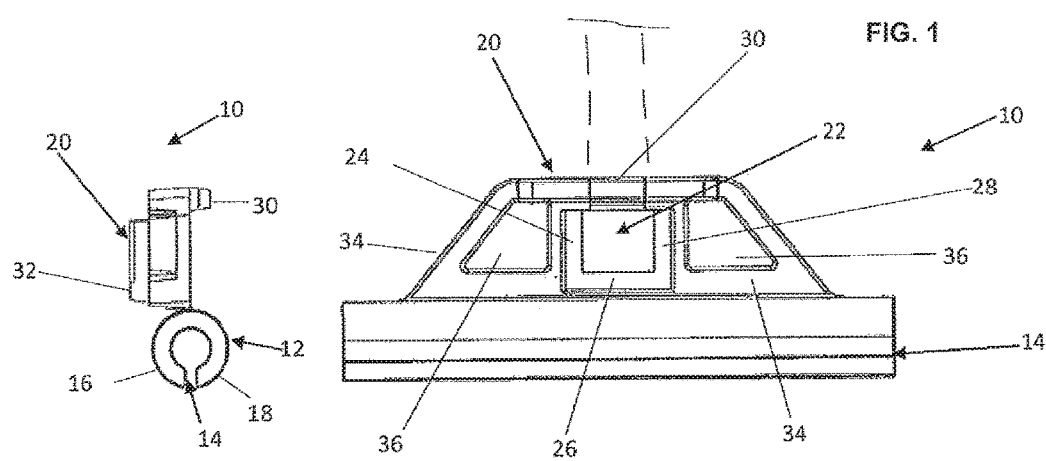
FIG. 1
FIG. 2
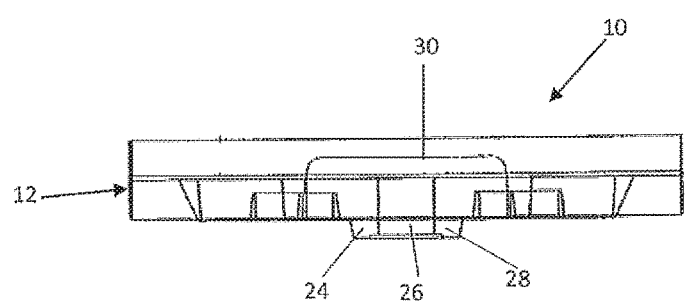
FIG. 3

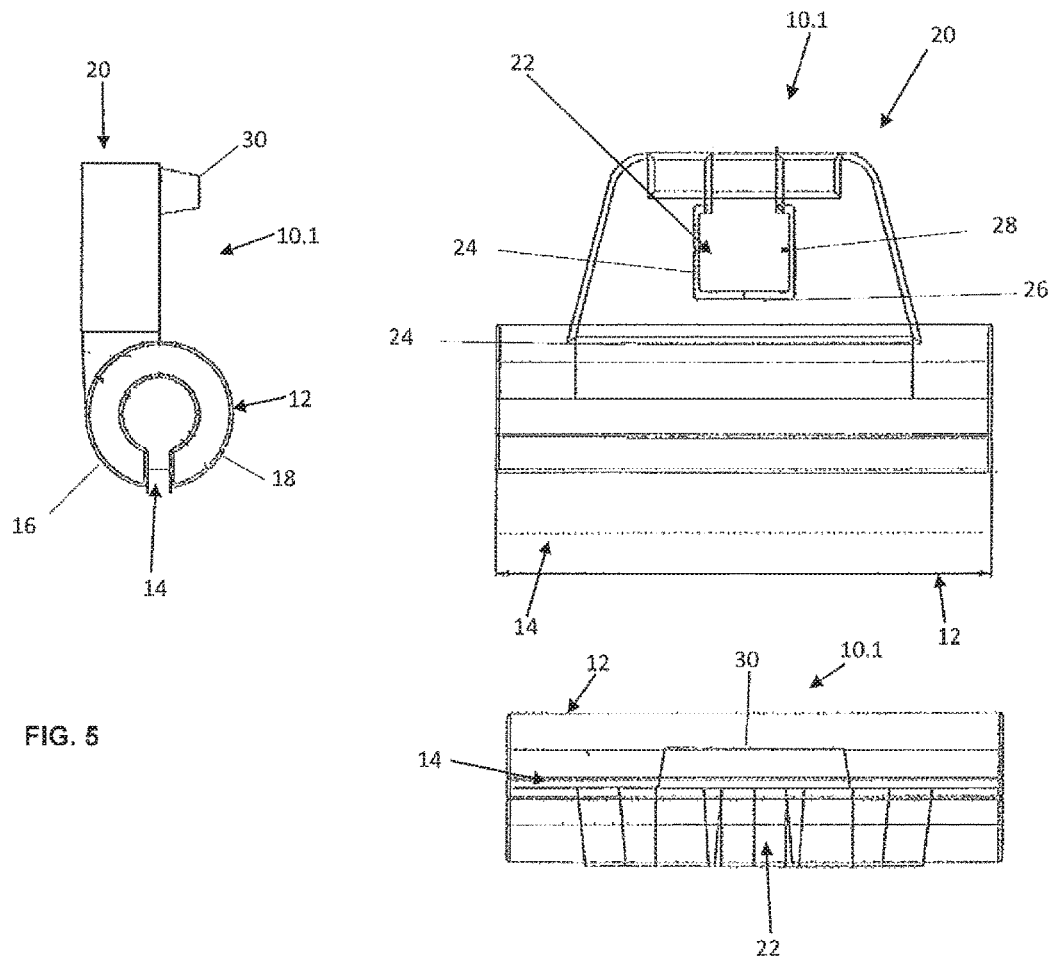

US 10,308,425 B2

SECURING OF SHEET MATERIAL WHICH IS IN THE FORM OF A LINER, A COVER OR A CURTAIN

CROSS-REFERENCE TO RELATED APPLICATIONS

This is a continuation of application Ser. No. 15/397,608, filed Jan. 3, 2017, which is a continuation of application Ser. No. 14/527,075, filed Oct. 29, 2014, now abandoned, which claims the benefit of South African Patent Application No. 2014/07040, filed Sep. 29, 2014, and South African Patent Application No. 2013/08869, filed Nov. 26, 2013, the disclosures of which are incorporated herein in their entirety by reference.

FIELD OF THE INVENTION

This invention relates to the securing of sheet material which is in the form of a liner, a cover or a curtain.

BACKGROUND TO THE INVENTION

It is known to protect goods being shipped in a shipping container from variations in temperature by providing a liner in the shipping container. Examples of such liners are disclosed in, PCT specification WO2010/046790 and EP Specification 1 780 147 A1.

The fitting of shipping container liners is not a simple matter as they must be secured to the lashing points of the shipping container in such manner that an air gap is created between the walls and roof of the shipping container and the liner. Also, the liner must not sag down and touch the goods in the container.

In WO 2010/046790 the attachment hooks on the liner are fixed. However the lashing points on containers are not always at the same location. The number of lashing points and the spacing between them varies. Consequently, some hooks are found to be offset from the respective lashing point and this makes satisfactory installation of the liner difficult or even impossible. In respect of the liner is disclosed in EP Specification 1 780 147 A1, using a single piece of webbing on each side of the container and threading it through a number of hooks before trying to pull it taut does not, in practice, work very well. The liner can still sag to an unacceptable extent.

It is not only shipping containers that need to be fitted with liners. The load spaces of some transport trucks and trailers have lashing points. These, if the goods being transported require it, have to be fitted with liners.

The term "shipping container" as used herein consequently encompasses not only the ISO type of container used mainly for sea transport but also trucks and trailers which have lashing points.

There are other circumstances where sheet material must be secured in place. An example is that of tarpaulins which are used to cover goods on, for example, an open vehicle. Tarpaulins usually have eyelets and a cord is threaded through the eyelets and around hooks or other protuberances on the vehicle. Threading the cord through the eyelets, then around whatever mountings are provided can be time-consuming. In other circumstances sheet material has to be hung to form a curtain.

In all these situations a rapid method of attaching the sheet material to a fixed structure is advantageous.

BRIEF DESCRIPTION OF THE INVENTION

According to one aspect of the present invention there is provided a mounting securing in place a sheet which constitutes a liner, cover or curtain, the sheet having an elongate attachment zone which is thicker than the material of the sheet, the mounting including a clip which is formed with an elongate hollow portion having a longitudinal slit along the length thereof, said attachment zone being in said hollow portion with the sheet emerging from said portion through the slit, and an elongate element connected to a lashing point, said clip having a passageway through which said elongate element passes thereby to attach said clip and the attachment zone to said lashing point.

Said elongate element can be a cord which passes through said passageway, there being a hook on the cord for attachment to the lashing point. In this form said passageway is preferably constituted by the bore of a cylinder, the axes of said cylinder and said hollow portion being parallel to one another.

In a further form said elongate element is a cable tie including a block which has a slot through it, a ratchet tooth in the slot and a strap which has a plurality of transverse ribs, the strap extending from the block and the ribs and ratchet tooth coming into interlocking engagement when the strap is pushed through the slot thereby to prevent the strap being withdrawn from the slot in the opposite direction, said passageway being constituted by an aperture of the clip into which said block fits.

Said attachment zone is preferably formed by folding said sheet over on itself with a cord between the superimposed layers, the layers being secured together to trap the cord.

According to a further aspect of the present invention there is provided the combination of:

A liner of sheet material which has a top wall, elongate sidewalls and attachment zones which are thicker than the sheet material and which extend along the liner where the longer edges of the top wall join the upper edges of the sidewalls;

A shipping container having lashing points;

Two sets of clips each of which has an elongate hollow portion which is formed with a longitudinal slit along the length thereof, said attachment zones of the liner being in said hollow portions and the sheet material of the liner emerging from said hollow portions through said slits, said clips being free to slide along the attachments zones, each clip having a passageway therethrough;

Hooks attached to the lashing points and having openings therein; and

Cords extending through said openings in the hooks and through the passageways of the sets of clips, the clips and hooks alternating along the lengths of the cords.

BRIEF DESCRIPTION OF THE DRAWINGS

For a better understanding of the present invention, and to show how the same may be carried into effect, reference will now be made, by way of example, to the accompanying drawings in which:—

FIG. 1 is a side elevation of a liner mounting clip;
FIG. 2 is an end elevation of the clip of FIG. 1;
FIG. 3 is a top plan view of the clip of FIGS. 1 and 2:
FIG. 4 is a side elevation of a further clip;
FIG. 5 is an end elevation of the clip of FIG. 4;
FIG. 6 is a top plan view of the clip of FIGS. 4 and 5.

DETAILED DESCRIPTION

Figure 7:
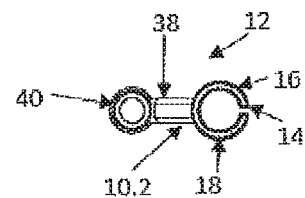
FIG. 7 is an end view of a third form of clip.

The clip illustrated in FIGS. 1, 2 and 3 is designated 10 and comprises a generally cylindrical portion 12 which has a longitudinally extending slit 14 therein. The slit 14 enables the two generally semi-cylindrical portions designated 16, 18 to flex with respect to one another to increase the width of slit 14.

A mounting portion 20 is moulded integrally with the portion 12. The portions 12 and 20 are offset with respect to one another as best seen in the end elevation of FIG. 2.

The mounting portion 20 extends for most of the length of the cylindrical portion 12 and has therein a central aperture which is designated 22. The aperture 22 is closed on three sides. Raised ribs designated 24, 26 and 28 form the boundary of the aperture 22 on these three sides. On the fourth side of the aperture there is a bar designated 30 which, as best seen in FIG. 3, partially closes the fourth side of the aperture 22. One face of the mounting portion 20, that designated 32 in FIG. 2, is planar and the other face, that visible in FIG. 1, is provided with raised strengthening ribs 34 which bound two depressions 36.

The clip 10.1 shown in FIGS. 4 to 6 is similar to that shown in FIGS. 1, 2 and 3 and where applicable like parts of been designated with like reference numerals. The clip 10.1 is smaller than the clip 10 of FIGS. 1 to 3, its cylindrical portion 12 being approximately half the length of the cylindrical portion 12 of the clip of FIGS. 1 to 3, with the mounting portion 16 being commensurately smaller. The aperture 22 in FIGS. 4 to 6 is also of smaller dimensions than the aperture 22 of FIGS. 1 to 3.

The clips are used with what are known in the art as "cable ties". A cable tie conventionally comprises a locking portion which is in the form of a block which has a slot through it with a flexible ratchet tooth in the slot. The cable tie further has a strap which is integral with the block and has a plurality of transverse ribs. As the strap is pushed through the slot, the ratchet tooth is deformed by the transverse ribs as they pass it. The tooth and the ribs are configured so that there is a locking action between them and the part of the strap that has passed through the slot consequently cannot be pulled back through the slot.

The aperture 22 in FIGS. 1, 2 and 3 is sized so that it can receive the block of a cable tie. The sizing of the aperture 22 is such that the block is a tight fit in the aperture 22. The part of the strap which is immediately adjacent the block lies against the bar 30 and the remainder of the strap protrudes upwardly from the clip 10 as the clip 10 is viewed in FIG. 1. The dashed lines in that Figure indicate the position of the strap.

The clips and cable ties can be used to mount a thermally reflective liner in a shipping container as is described below. They can also be used to mount any other sheet material such as a tarpaulin the upper edge of which is to be secured to a fixed structure so that the tarpaulin hangs down from the fixed structure to form a curtain.

The liner for the shipping container is fabricated from metallized sheet material and comprises side, top and bottom walls. At one end the liner is closed by an end wall and at the other end it has a flap which can be pulled to a closed position after the cargo has been loaded into the liner.

As the liner is fabricated, cords are incorporated into it. In the preferred form there are vertical cords where the side walls join the end wall and horizontal cords where the top and bottom walls join the sidewalls. The cords can be incorporated by folding the sheet material around the cord and then sewing the sheet material along a line parallel to the cord so that the cord is in a tube constituted by the material of the liner itself.

Two of the clips of the form shown in FIGS. 1, 2 and 3 are attached to the vertical cords by pressing the cord through the slit 14 into the hollow interior of the portion 12. The clips are slid along the vertical cords to a height which matches that of what are referred to as the horizontal corner bars of the shipping container. When the clips have reached the desired level in the vertical direction, the cable ties which are attached to the clips are looped around the horizontal corner bars, pushed through the slots in the blocks and pulled tight thereby to fix the end wall of the liner to the shipping container.

Clips of the form shown in FIGS. 1 to 3 are attached, as described above, to the cords which are positioned where the side walls meet the top wall. The positions of the clips closest to the end wall are adjusted in the horizontal direction until they are aligned with the lashing points closest to the closed end of the container. The straps of the cable ties which are secured to the clips are then looped around upper, end lashing points, pushed through the slots in the blocks of the cable ties and pulled tight. The parts of the liner's side walls which are closest to the container's end wall are now hanging from the lashing points.

Two of the clips illustrated in FIGS. 4 to 6 are then slid along the cords which are located where the bottom wall of the liner meets the side walls. The positions of the clips are adjusted horizontally until they are aligned with the lower lashing points of the container that are closest to the end wall. The straps of the cable ties are then looped around these lashing points, pushed through the slots of the blocks of the ties, and pulled tight.

Further clips are used to connect the liner to the upper and lower lashing points along the full length of the container.

The clips of FIGS. 1 to 3 are of necessity stronger than the clips of FIGS. 4 to 6 because the liner is hanging from these. The smaller clips of FIGS. 4 to 6, which are used where the bottom wall of the liner merges with the side walls, do not carry significant weight. The cable ties used with the smaller clips are commensurately smaller and less strong than the ties used with the upper clips.

Figure 8:
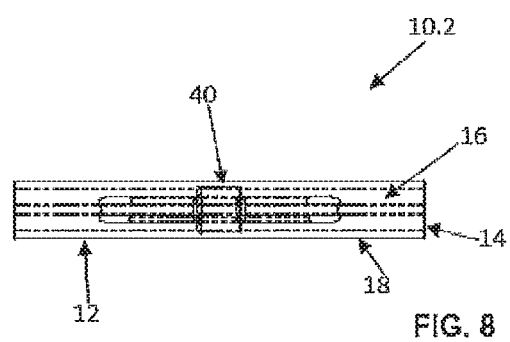
FIG. 8 is a plan view of the clip of FIG. 7.
Figure 9:
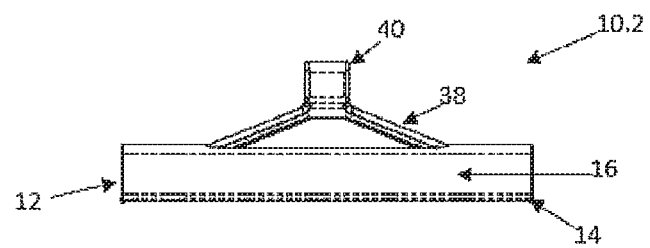
FIG. 9 is a side elevation of the clip of FIGS. 7 and 8.

If the clips are to be used to suspend a tarpaulin or other sheet material which is in the form of a curtain, then the cord is incorporated into the tarpaulin along its upper edge. Clips of either of the forms described, depending on the weight of the tarpaulin which is to form the curtain, are slid along the cord until they are appropriately positioned with respect to whatever lashing points are provided and then the ties are used to secure the upper edge of the curtain to the lashing points.

Where the clip 10.2 of FIGS. 7 to 9 has parts in common with the clips of the earlier Figures, like references have been used. Specifically, the cylindrical portion 12, the slit 14 and the semi-cylindrical portions 16, 18 have been correspondingly referenced.

A triangular flange 38 extends for about half the length of the cylindrical portion 12 and protrudes radially outwardly from the portion 12. A short cylinder 40 is moulded integrally with the flange 38. The axis of the portion 12 and the axis of the cylinder 40 are parallel to one another.

Figure 10:
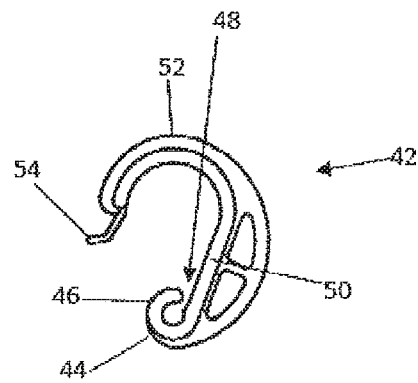
FIG. 10 is a side elevation of a hook.
Figure 11:
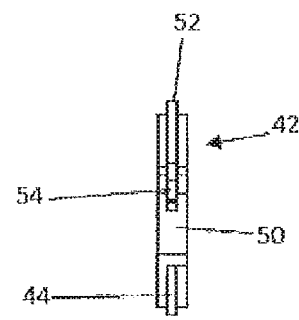
FIG. 11 is a front elevation of the hook.
Figure 12:
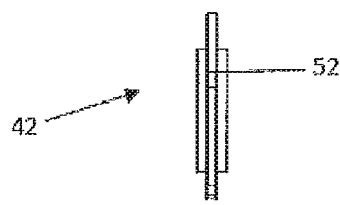
FIG. 12 is a top plan view of the hook.

Turning now to FIGS. 10 to 12, these illustrate a hook designated 42. The hook is part circular in shape as best seen in FIG. 10. The lower part 44 of the hook turns back on itself through almost 360 degrees to form a transverse opening 46 which has a narrow entrance 48. The hook further includes a straight section 50, the lower part 44 being at one end of the section 50. A semi-circular section 52 extends from the end of the section 50 remote from the part 44. A guide 54 extends from the free end of the section 52.

A plurality of the clips 10.2 of FIGS. 7 to 9 and a plurality of the hooks 42 of FIGS. 10 to 12 are used to suspend a thermally insulating liner in a shipping container.

Figure 13:
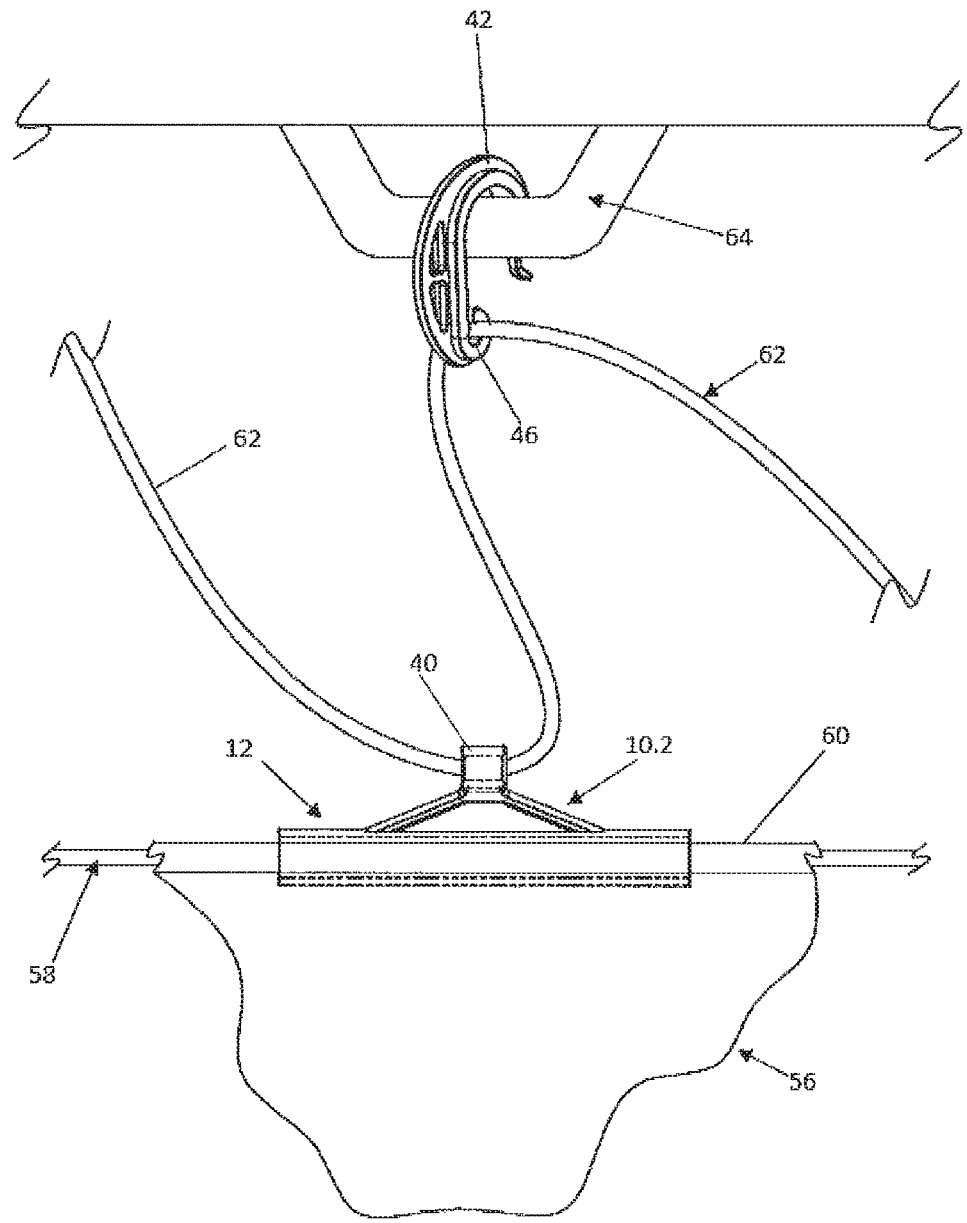
FIG. 13 is a pictorial view illustrating the use of the clip of FIGS. 7 to 9 and the hook of FIGS. 10 to 12.

Part of the side wall of a liner, designated 56, is shown in FIG. 13. The liner has a top wall, elongate side walls and an end wall which closes one end of the liner. A flap is provided at the other end of the liner. One edge of the flap is attached to the remainder of the liner and a releasable fastener, such as a sliding clasp fastener, is provided to connect the other three edges of the flap to the remainder of the liner. The liner can have a floor. However, it is also possible for the liner to be without a floor.

Cords 58 (FIG. 13) extend along the liner where the longitudinally extending edges of the top wall are sewn or otherwise secured to the longitudinally extending upper edges of the sidewalls. The cords are sewn into the seams 60 which are thus formed. The cylindrical portion 12 of the clip 10.2 has an internal diameter such that it can receive the seam 60 which has the cord 58 sewn inside it. The portions 16, 18 are sufficiently flexible to allow the cord 58 to be pressed into the clip 10.2 through the slit 14. The fit of the clip on the seam is such that the clip can readily slide along the seam.

Two further cords 62 are provided. Each of these passes through the cylinders 40 of the respective set of clips 10.2. The cords 62 are thus external of the seam 60. Between each adjacent pair of clips 10.2 there is one of the hooks 42. The cords 50 pass through the passageways 46 in the hooks 42. The hooks 42 can slide along the cords 62.

To secure the liner inside the container, the ends of the cords 62 are tied to anchorages that are provided at the closed end of the container. At this stage the closed end of the liner hangs down from the anchorages and the liner lies on the floor along the length of the container. The first hook 42 on each cord 62 is then attached to those lashing points which are closest to the closed end of the container. The clips 10.2 closest to the closed end of the container are slid along the seams 60 until they are approximately under the first lashing points and hooks. The lashing point is designated 64 in FIG. 13. The guide 54 facilitates attachment of the hook 42 to the lashing point 64.

The next two hooks are attached to the next two lashing points and the next two clips are moved to positions approximately under the hooks. This procedure continues until hooks are attached to all the lashing points that can be accessed and there are clips close to the lashing points which have hooks attached to them.

The ends of the two cords 62 which are at the open end of the liner are then gripped and the cords are pulled is taut as possible. This has the effect of lifting the clips 10.2, and hence the seams 60 to which they are fitted, towards the roof of the container.

Starting at the closed end of the container, the first clips 10.2 on each side are slid along the seams 60 so that the lengths of the parts of the cords 62 between the anchorage points and the first clips are reduced to a minimum. All the remaining clips 10.2 are moved along the seams 60 to shorten the distances between the clips and the adjacent hooks 42. This has the effect of pulling the clips further upwardly and outwardly towards the lashing points. The clips 10.2 on opposite sides of the liner move apart during this procedure and the inevitable sag of the top wall of the liner is reduced. The top wall still sags down under its own weight but not to an extent such that it interferes with loading of the cargo into the liner or touches the goods in the loaded container.

The invention claimed is:

1. A method of mounting a liner of sheet material which has an elongate top wall having longer edges and elongate sidewalls having elongate upper edges that are joined to the longer edges of the top wall, in a shipping container having a first set of lashing points and a second set of lashing points, each set of lashing points comprising a plurality of lashing points, with each lashing point including structure fixed to the shipping container for allowing the liner to be secured to the shipping container, the method comprising the steps of:
   providing the liner with attachment zones which are thicker than the sheet material of the liner and which extend along the liner where the longer edges of the top wall join the upper edges of the sidewalls;
   attaching first and second sets of clips to the liner where the longer edges of the top wall join the upper edges of the sidewalls, the clips having passageways therethrough and being free to slide along the attachment zones so as to be positionable under the lashing points;
   attaching one hook of a first set of hooks to a lashing point of said first set of lashing points, wherein each hook has an upper part that is hook-shaped to attach to the structure of the lashing point and has a lower part that turns back on itself to form an opening;
   attaching one hook of a second set of hooks each of which has an opening therein to a lashing point of said second set of lashing points;
   positioning one of the clips of the first set under that hook of the first set of hooks which is attached to the respective lashing point;
   positioning one of the clips of the second set under that hook of the second set of hooks which is attached to the respective lashing point;
   passing a first elongate cord through the passageway of the said one clip of the first set of clips and through the opening in the hook that is above said one clip, and progressively attaching the hooks of the first set to the lashing points of the first set and passing said first cord through the clips and hooks of said first sets in such manner that the clips and hooks alternate along the length of the first cord;
   passing a second elongate cord through the passageway of said one clip of the second set of clips and through the opening in the hook that is above said one clip of the second set of clips and progressively attaching the hooks of the second set to the lashing points of the second set and passing said second cord through the clips and hooks of the second sets of clips and hooks in such manner that the clips and hooks of the second sets alternate along the length of the second cord; and
   pulling on the first and second cords to lift the clips and the liner towards the hooks.

2. A method of mounting a liner of sheet material, the liner having an elongate top wall having longer edges, elongate sidewalls having elongate upper edges that are joined to the longer edges of the top wall, and attachment zones which are thicker than the sheet material of the liner and which extend along the liner where the longer edges of the top wall join the upper edges of the sidewalls, in a shipping container having a first set of lashing points located on one side of the shipping container and a second set of lashing points located on another side of the shipping container, with each lashing point including structure fixed to the shipping container for allowing the liner to be secured to the shipping container, the method comprising the steps of:

attaching first and second sets of clips to the liner where the longer edges of the top wall join the upper edges of the sidewalls, each clip having a passageway therethrough and being free to slide along one of the attachment zones so as to be positionable under one of the lashing points of the shipping container;

attaching hooks of a first set of hooks to the lashing points on one side of the shipping container, wherein each hook has an upper part that is hook-shaped to attach to the structure of the lashing point and has a lower part that turns back on itself to form an opening;

attaching hooks of a second set of hooks to the lashing points on the opposite side of the shipping container, wherein each hook has an upper part that is hook-shaped to attach to the structure of the lashing point and has a lower part that turns back on itself to form an opening;

positioning clips of the first set of clips under hooks of the first set of hooks which are attached to the lashing points;

positioning clips of the second set of clips under hooks of the second set of hooks which are attached to the lashing points;

passing a first elongate cord through the passageway of one clip of the first set of clips and through the opening in the hook that is above the one clip of the first set of clips and then passing the first cord through the other clips and hooks of the first sets in such manner that clips and hooks of the first sets alternate along the length of the first cord;

passing a second elongate cord through the passageway of one clip of the second set of clips and through the opening in the hook that is above the one clip of the second set of clips and then passing the second cord through the other clips and hooks of the second sets of clips and hooks in such manner that clips and hooks of the second sets alternate along the length of the second cord; and pulling on the first and second cords to taughten the cords and lift the clips and the liner towards the hooks.

3. A method of mounting a liner of sheet material in a shipping container having a first set of lashing points located on one side of the shipping container and a second set of lashing points located on another side of the shipping container, each set of lashing points comprising a plurality of lashing points including structure coupled to the shipping container for allowing the liner to be secured to the shipping container, the method comprising the steps of:

providing a liner having an elongate top wall having longer edges, elongate sidewalls having elongate upper edges that are joined to the longer edges of the top wall, and attachment zones which are thicker than the sheet material of the liner and which extend along the liner where the longer edges of the top wall join the upper edges of the sidewalls;

attaching first and second sets of clips to the liner where the longer edges of the top wall join the upper edges of the sidewalls, each clip having a passageway therethrough and being free to slide along one of the attachment zones so as to be positionable under a lashing point of a shipping container;

attaching hooks of a first set of hooks to the lashing points on one side of a shipping container;

attaching hooks of a second set of hooks to the lashing points on the opposite side of the shipping container, wherein each hook of the first and second sets of hooks has an upper part that is hook-shaped to attach to the structure of the lashing point and has a lower part that turns back on itself to form an opening;

positioning clips of the first set of clips under hooks of the first set of hooks which are attached to lashing points;

positioning clips of the second set of clips under hooks of the second set of hooks which are attached to lashing points;

passing a first elongate cord through the passageway of one clip of the first set of clips and through the opening of the hook that is above the one clip of the first set of clips and then passing the first cord through the other clips and hooks of the first sets in such manner that clips and hooks of the first sets alternate along the length of the first cord;

passing a second elongate cord through the passageway of one clip of the second set of clips and through the opening of the hook that is above the one clip of the second set of clips and then passing the second cord through the other clips and hooks of the second sets of clips and hooks in such manner that clips and hooks of the second sets alternate along the length of the second cord; and pulling on the first and second cords to taughten the cords and lift the clips and the liner towards the hooks.

\* \* \* \* \*